US009464561B2

United States Patent
Nguyen et al.

(10) Patent No.: US 9,464,561 B2
(45) Date of Patent: Oct. 11, 2016

(54) COOLING SYSTEM AND METHOD FOR A HYBRID POWERTRAIN OF A MOTOR VEHICLE

(71) Applicant: RENAULT s.a.s., Boulogne-Billancourt (FR)

(72) Inventors: Hoang-Giang Nguyen, Ris Orangis (FR); Jean Van-Frank, Rueil Malmaison (FR); Ahmed Ketfi-Cherif, Elancourt (FR); Christophe Dang-Van-Nhan, Villejuif (FR); Robert Yu, Montigny le Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/429,954

(22) PCT Filed: Sep. 11, 2013

(86) PCT No.: PCT/FR2013/052080
§ 371 (c)(1),
(2) Date: May 8, 2015

(87) PCT Pub. No.: WO2014/044952
PCT Pub. Date: Mar. 27, 2014

(65) Prior Publication Data
US 2016/0032815 A1 Feb. 4, 2016

(30) Foreign Application Priority Data

Sep. 20, 2012 (FR) ...................................... 12 58841

(51) Int. Cl.
| | |
|---|---|
| *F01P 7/14* | (2006.01) |
| *B60K 6/22* | (2007.10) |
| *F01P 7/16* | (2006.01) |
| *F01P 3/20* | (2006.01) |
| *F01P 5/10* | (2006.01) |
| *B60K 1/00* | (2006.01) |

(52) U.S. Cl.
CPC . *F01P 7/14* (2013.01); *B60K 6/22* (2013.01); *F01P 3/20* (2013.01); *F01P 5/10* (2013.01);

(Continued)

(58) Field of Classification Search
CPC .............. F01P 7/14; F01P 7/16; F01P 7/164; F01P 7/165; F01P 3/20; F01P 5/10; F01P 5/12; F01P 2005/105; B60K 6/22; B60K 11/02
USPC ................. 180/65.275, 65.28, 65.285, 65.29
See application file for complete search history.

(56) References Cited

U.S. PATENT DOCUMENTS

| | | | | |
|---|---|---|---|---|
| 5,251,588 A | * | 10/1993 | Tsujii | ........................ B60K 6/46 123/142.5 E |
| 7,424,868 B2 | * | 9/2008 | Reckels | .................. F01P 7/167 123/41.1 |

(Continued)

OTHER PUBLICATIONS

International Search Report issued Nov. 20, 2013 in PCT/FR2013/052080 Filed Sep. 11, 2013.

(Continued)

*Primary Examiner* — John Walters
(74) *Attorney, Agent, or Firm* — Oblon, McClelland, Maier & Neustadt, L.L.P.

(57) ABSTRACT

A cooling system for a hybrid powertrain of a motor vehicle comprising an internal combustion engine and an electric traction assembly, comprising a main circuit that can be traversed by a coolant in order to cool the internal combustion engine to a first temperature level and a secondary circuit that can be traversed by a coolant to cool the electric traction assembly to a second temperature level, lower than the first level, each of the circuits and comprising a radiator capable of cooling the coolant by means of heat exchange with an air flow, at least one hydraulic pump for circulating the coolant in the coolant circuits, and one electronic control unit capable of controlling the hydraulic pumps. The control unit comprises a module for recovering information on the dynamics of the vehicle and a module for controlling the flow from the hydraulic pumps on the basis of that information.

18 Claims, 2 Drawing Sheets

(52) U.S. Cl.
CPC ............... *F01P 7/164* (2013.01); *F01P 7/165* (2013.01); *B60K 2001/003* (2013.01); *F01P 2050/24* (2013.01); *Y10S 903/902* (2013.01)

(56) References Cited

U.S. PATENT DOCUMENTS

| | | | | |
|---|---|---|---|---|
| 7,628,125 | B2 * | 12/2009 | Kaita | B60K 11/02 123/41.31 |
| 8,091,668 | B2 * | 1/2012 | Amano | B60K 11/085 123/41.05 |
| 2007/0272173 | A1 | 11/2007 | Reckels et al. | |
| 2009/0145375 | A1 | 6/2009 | Kaita et al. | |
| 2010/0147611 | A1 | 6/2010 | Amano et al. | |

OTHER PUBLICATIONS

French Preliminary Search Report issued Jun. 11, 2013 in Patent Application No. FR 12 58841 Filed Sep. 20, 2012 (with English translation of categories of cited documents).

* cited by examiner

COOLING SYSTEM AND METHOD FOR A HYBRID POWERTRAIN OF A MOTOR VEHICLE

BACKGROUND

The present invention relates to the field of cooling systems for a hybrid powertrain of a motor vehicle.

A hybrid drive vehicle or hybrid traction vehicle is provided with a first drive source and/or an electricity generator comprising an internal combustion engine and a second drive source and/or a source of transforming electrical energy into mechanical energy implemented by one or more electric motors. It is possible, for example, to have two electric motors powered by a battery and each positioned in the region of a rear wheel of the motor vehicle. Such electric motors are generally called "wheel motors".

The internal combustion engine and the electric motors as well as the electronic power components controlling the operation of the electric motors do not require the same degree of cooling to operate in optimal conditions. The temperature ranges of the heat transfer fluids circulating in the cooling circuits of the different elements are not the same. Thus, the temperature of the coolant at the inlet of the various electronic components must not exceed 80° C., while the temperature at the inlet of the electric motor must not exceed 90° C. and that at the inlet of the internal combustion engine is limited to 105° C.

To resolve the problems resulting from these differences in temperature, it is possible to use separate cooling circuits. A first circuit is thus used for cooling the internal combustion engine. This circuit corresponds to a conventional cooling circuit of an internal combustion engine in a conventional vehicle and is provided with a first radiator. A second circuit may thus be provided for cooling the electric traction assembly or electric powertrain comprising at least one electric motor and various electronic power components.

Such a cooling system has a first drawback, in that the circulation pump of the second cooling circuit of the electric traction assembly has to operate continuously. A further drawback is due to the position of the radiator of the second cooling circuit which is generally placed upstream of the radiator of the first cooling circuit, thus causing additional pressure losses in the flow of cooling air.

A further solution consists in using a cooling circuit which is common to the internal combustion engine and the electric traction assembly. The cooling circuit of the internal combustion engine at high temperature, between 90 and 115° C., is used to cool the electric components of the electric traction assembly at lower temperatures, between 70 and 80° C. Such a cooling system uses a single radiator comprising an inlet and two outlets.

Reference may be made in this regard to the French patent application 2 844 224 (Renault) which discloses the use of a single cooling circuit permitting two temperature levels to be provided for the heat transfer fluid, on the one hand, for cooling the internal combustion engine at a high temperature, for example 90 to 115° C. and, on the other hand, for cooling the components of the electric traction assembly at a lower temperature, for example 70 to 80° C. The cooling system comprises a single radiator having a single inlet and two outlets so as to define a main circuit and an auxiliary circuit. A two-way electrostatic valve associated with a three-way thermostatic valve makes it possible to control the entire cooling system and to obtain for the heat transfer fluid the temperatures required both for the internal combustion engine and for the components of the electric traction assembly. However, the two-way thermostatic valve has to be placed in the cooling circuit at a specific location and has to be designed so as to open at relatively low temperatures. The adaptation of such a structure to a cooling system of a vehicle with a hybrid powertrain results in significant costs.

However, the flow of the heat transfer fluid in such a structure depends on the temperature of the fluid and not on the dynamic conditions of the motor vehicle, which does not enable the consumption of fuel and the performance of the electric motor to be optimized.

BRIEF SUMMARY

The subject of the present invention is to improve further the cooling systems while simplifying said systems.

The subject of the present invention is also to optimize the consumption of fuel and to reduce the discharge of carbon dioxide by optimizing the performance of the electric motor.

The present invention relates to a cooling system for a hybrid powertrain of a motor vehicle comprising an internal combustion engine and an electric traction assembly or electric powertrain comprising a main circuit which is able to be traversed by a heat transfer fluid in order to cool the internal combustion engine to a first temperature level and a secondary circuit which is able to be traversed by a heat transfer fluid in order to cool the electric traction assembly to a second temperature level, lower than the first level, each of the circuits comprising a radiator which is capable of cooling the heat transfer fluid by heat exchange with an air flow, at least one hydraulic pump for circulating the heat transfer fluid in the cooling circuits and an electronic control unit which is capable of controlling the hydraulic pumps.

The control unit comprises a module for recovering information on the dynamics of the vehicle and a module for controlling the flow rate from the hydraulic pumps as a function of this information.

Thus, the flow rate from the pumps is controlled as a function of the conditions of use of the motor vehicle when traveling, for example, when turning, when traveling in a straight line or on an incline, and according to the speed of the motor vehicle. Such a control of the pumps makes it possible to adjust in an optimal manner the cooling of each of the elements to be cooled and to optimize the consumption of fuel and to reduce the discharge of carbon dioxide by optimizing the performance of the electric motor.

The information on the dynamics of the vehicle comprises, for example, the speed of the motor vehicle, the steering angle of the steering wheel, the gradient of the road and the adhesion to the ground.

Advantageously, the module for controlling the hydraulic pumps comprises a module for calculating the quantity of heat to be discharged by the electric powertrain and the internal combustion engine and a module for determining a flow rate set point as a function of the calculated quantity of heat to be discharged.

The control unit may comprise a module for controlling the change of drive mode as a function of the information on the dynamics of the vehicle and a module for controlling the engine torque as a function of the information on the dynamics of the vehicle or according to a manual selection by the driver.

Advantageously, the control unit comprises a module for regulating the control of the pumps as a function of the engine torque controls, the drive mode and the engine speed.

The electric traction assembly comprises, for example, two electric motors and two inverters, each associated with an electric motor, and in which the second cooling circuit comprises three circulating pumps respectively arranged at the outlet of the radiator, at the inlet of the inverters and at the inlet of the radiator.

According to a second feature, the invention relates to a cooling method for a hybrid powertrain of a motor vehicle comprising an internal combustion engine and an electric traction assembly, in which the internal combustion engine is cooled to a first temperature level and the electric traction assembly is cooled to a second temperature level, lower than the first level, the heat transfer fluid is circulated by actuating hydraulic circulating pumps, and information is recovered on the dynamics of the vehicle and the hydraulic pumps are controlled as a function of this information.

The information on the dynamics of the vehicle comprises, for example, the speed of the motor vehicle, the steering angle of the steering wheel, the gradient of the road and the adhesion to the ground.

Advantageously, the quantity of heat to be discharged by the electric traction assembly and the internal combustion engine is calculated and a flow rate set point is determined as a function of the calculated quantity of heat to be discharged.

According to one embodiment, the change of drive mode is controlled as a function of the information on the dynamics of the vehicle and the engine torque is controlled as a function of the information on the dynamics of the vehicle or according to a manual selection by the driver.

For example, the control of the pumps is regulated as a function of the engine torque controls and the drive mode and the engine speed.

BRIEF DESCRIPTION OF THE DRAWINGS

The present invention will be understood more clearly by reading the description of several embodiments given by way of non-limiting example and illustrated in the accompanying drawings, in which.

DETAILED DESCRIPTION

In the remainder of the description, the term "electric motor" defines all of the machines which convert electrical energy into mechanical energy, or mechanical energy into electrical energy.

Figure 1:
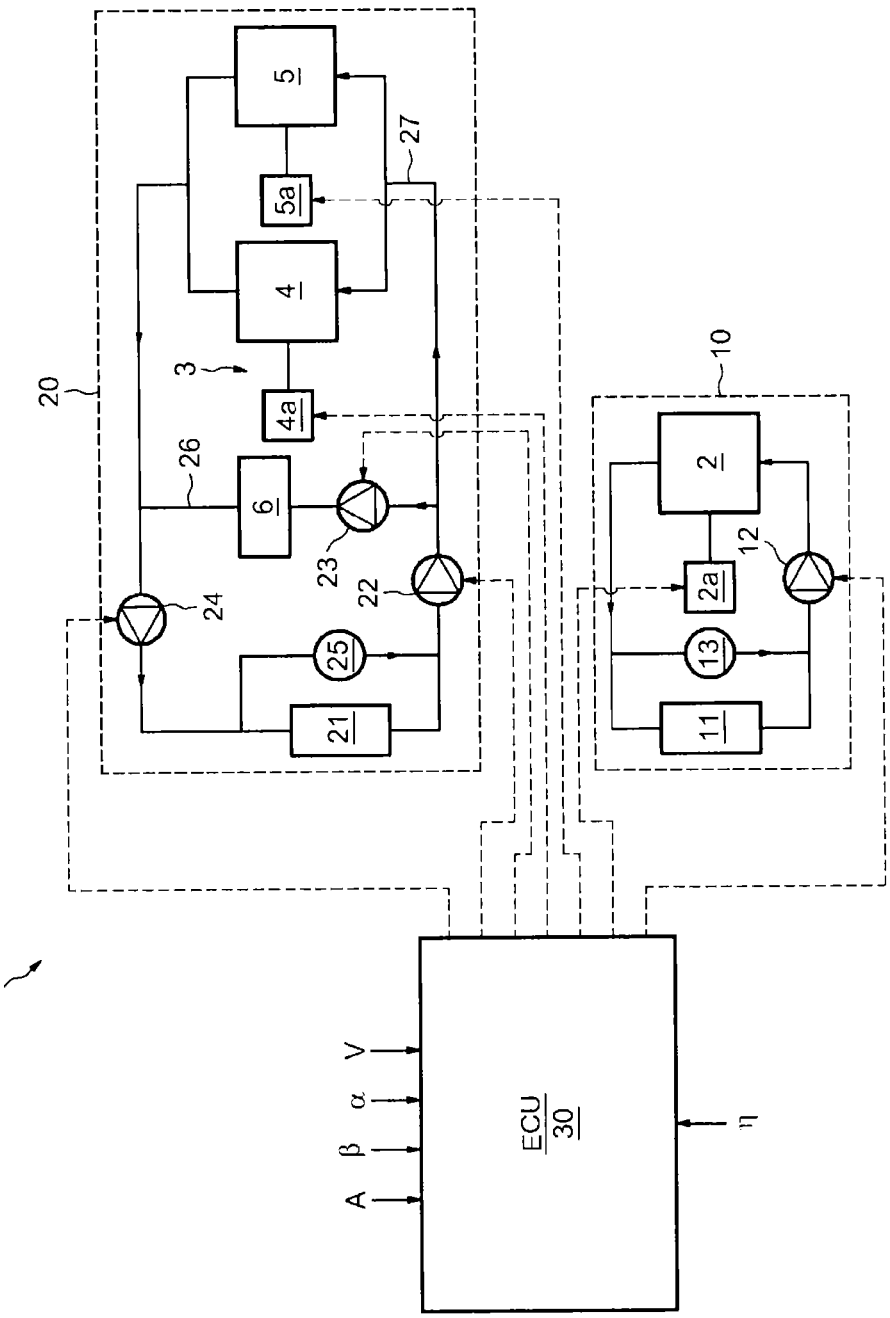
FIG. 1 is a schematic view of a cooling system according to the invention.

As illustrated schematically in FIG. 1, a cooling system, referenced 1 in its entirety, is designed for cooling a hybrid powertrain or hybrid drive train of a motor vehicle (not shown) comprising, on the one hand, an internal combustion engine 2 and, on the other hand, an electric traction assembly or electric powertrain or electric drive train 3. As illustrated, the electric traction assembly 3 comprises two electric motors 4, 5 associated with electronic power components, such as inverters 6. Each electric motor 4, 5 is powered by an electric battery (not shown) and is positioned in the region of a rear wheel (not shown) of the motor vehicle. The electric motors 4, 5 are of the asynchronous type, controlled by a control device such as inverters 6 provided with electronic switches (not shown), for example transistors of the VMOS (Vertical Metal Oxide Semiconductor) type or IGBT (Insulated Gate Bipolar Transistor) type, in order to vary the speed of rotation thereof. The inverters 6 and the electric motors 4, 5 incur heat losses such as iron losses or eddy current losses which result in heating. In order to avoid destruction due to excessive heating or impairment of performance, it is necessary to cool the inverters 6 and the electric motors 4, 5.

As the electric motors 4, 5 are decoupled, they do not require identical cooling, for example, when the motor vehicle turns, one of the electric motors may be operated to a greater extent than the other electric motor. As a variant, the electric motors 4, 5 may be decoupled when they operate with the internal combustion engine, i.e. in hybrid drive mode, and coupled in electric mode.

As the operating temperature ranges of the internal combustion engine 2, the electric motors 4, 5 and the inverters 6 are different, it is necessary to cool these various components differently.

The cooling system 1 comprises a first cooling circuit 10 of the internal combustion engine 2 and a second cooling circuit 20 of the electric motors 4, 5 and the inverters 6.

The first cooling circuit 10 comprises a radiator 11 and a hydraulic pump 12 for circulating a heat transfer fluid in the first cooling circuit 10.

In addition, an expansion vessel 13 in the form of a hermetically sealed container traversed by the heat transfer fluid is arranged in the flow of heat transfer fluid. Such a member permits the expansion of the water used by way of heat transfer fluid as it maintains a certain volume of compressible air therein. It also permits the entire cooling circuit 10 to be maintained under pressure in order to avoid any risk of cavitation of the circulating pump 12 caused by the internal combustion engine 2. The expansion vessel 13 is mounted in parallel with the radiator 11 so as to limit to a maximum the volume of heat transfer fluid to be heated, which makes it possible to reduce the energy required for operating the assembly by reducing the length of time for the rise in temperature of the internal combustion engine 2.

The cooling of the internal combustion engine 2 is provided by the circulation of the heat transfer fluid in the radiator 11 under the action of the hydraulic pump 12. The internal combustion engine 2 is arranged, for example, in the region of the front axle of the motor vehicle.

The second cooling circuit 20 comprises a radiator 21 and three hydraulic pumps 22, 23, 24 for circulating a heat transfer fluid in the cooling circuit 20. An expansion vessel 25 is mounted in parallel with the radiator 21 in the second cooling circuit 20.

A first hydraulic pump 22 is mounted at the outlet of the radiator 21 downstream of the separation between a first branch 26 comprising the inverters 6 and a second branch 27 comprising the electric motors 4, 5, a second hydraulic pump 23 is mounted in the first branch 26 at the inlet of the inverters 6 and a third hydraulic pump 24 is mounted at the inlet of the radiator 21.

The cooling of the electric traction assembly 3 is provided by the circulation of the heat transfer fluid which is removed from the radiator 21 by the first hydraulic pump 22 and conveyed to the first and second branches 26, 27. The second hydraulic pump 23 removes the heat transfer fluid at the outlet of the first pump 22 in order to convey it into the inverters 6.

At the outlet of the electric motors 4, 5 and the inverters 6, the heat transfer fluid which has been subjected to heating is conveyed into the radiator 21 via the third pump 24 to cool it by heat exchange with the current of air which passes through said radiator.

The radiators 11, 21 serve to exchange heat from the heat transfer fluids of the cooling circuits by discharging heat from the heat transfer fluid via the air which passes through said radiators. A radiator generally comprises a fluid inlet manifold, a water tank and a fluid outlet manifold (not shown). The heat transfer fluid passes into a plurality of channels surrounded by fins with the purpose of promoting heat exchanges with the air passing between the fins. Air may be blown, for example, onto each of the radiators by means of a motorized fan unit (not shown) arranged upstream of each of the radiators 11, 21. By way of non-limiting example, each of the radiators 11, 21 may comprise flap valves (not shown) permitting the opening and closing of the channels as a function of the operation of the engine. The flap valves are controlled, for example, by actuators (not shown) connected to a management and control computer 2a, 4a, 5a of the internal combustion engine 2 and of the electric traction assembly 3. The start-up of the engine 2 and the motors 4, 5 causes the opening of the flap valves by means of the actuators. It is noteworthy that it could be possible to use any other radiator serving for the exchange of heat between the heat transfer fluid passing through said radiator and the air outside the radiator.

The first radiator 11 is generally traversed by a first coolant, the temperature thereof being approximately 100° C., and the second radiator 21 is generally traversed by a second heat transfer fluid, the temperature thereof being in the order of 50 to 70° C. The electric motors 4, 5 are thus able to operate at low temperature which increases their efficiency and extends their service life.

The cooling system comprises a first heat transfer fluid and a second heat transfer fluid which are able to be identical, such as for example water with added glycol, the direction of flow thereof being indicated by the arrows. It is noteworthy that the heat transfer fluid circulating in the first cooling circuit 10 could be different from the heat transfer fluid circulating in the second cooling circuit 20.

By way of non-limiting example, it is possible to provide valves (not shown) to circulate in the internal combustion engine 2 the coolant heated by its passage in the electric motors 4, 5 in order to preheat the internal combustion engine before start-up thereof. This preheating avoids the cold start-up of the internal combustion engine which increases the consumption of fuel and increases the emission of pollutants. Conversely, when the internal combustion engines and electric motors are at their nominal operating temperatures, the valves are closed to permit the electric motor to operate at a lower temperature than that of the internal combustion engine.

The cooling system 1 comprises a so-called "ECU" electronic control unit 30 permitting the hydraulic pumps 12, 22, 23, 24 and the computers 2a, 4a, 5a of the internal combustion engine 2 and electric motors 4, 5, to be controlled. The controls of the ECU 30 are illustrated in dashed lines in FIG. 1. The ECU 30 receives at the inlet information provided by different sensors (not shown) regarding the dynamics of the vehicle, i.e. on the speed V of the motor vehicle, the steering angle of the steering wheel α, the gradient of the road β and the adhesion to the ground A of the motor vehicle. The ECU 30 also receives the value of the speed η in each case of the engine 2 and the motors 4, 5.

The steering angle of the steering wheel α, expressed in degrees, represents the angles between a wheel and the chassis.

The gradient of the road β, expressed as a percentage, represents the gradient of a road for a horizontal displacement of 100 m.

The value of the adhesion A of the tires to the road is determined by means of speed sensors of the wheels detecting the wheel slip on the ground.

The adhesion is a function of the speed of displacement, of the type and state of the tires (width, type of rubber or caoutchouc, etc.) in addition to the state of the road (dry or wet road). The coefficient of adhesion may vary from 0.8 to 1.5. A method used for detecting the degree of adhesion is the measurement of the wheel slip via the data from the anti-lock braking system, also called "ABS", such as the speed in the region of the wheels.

Figure 2:
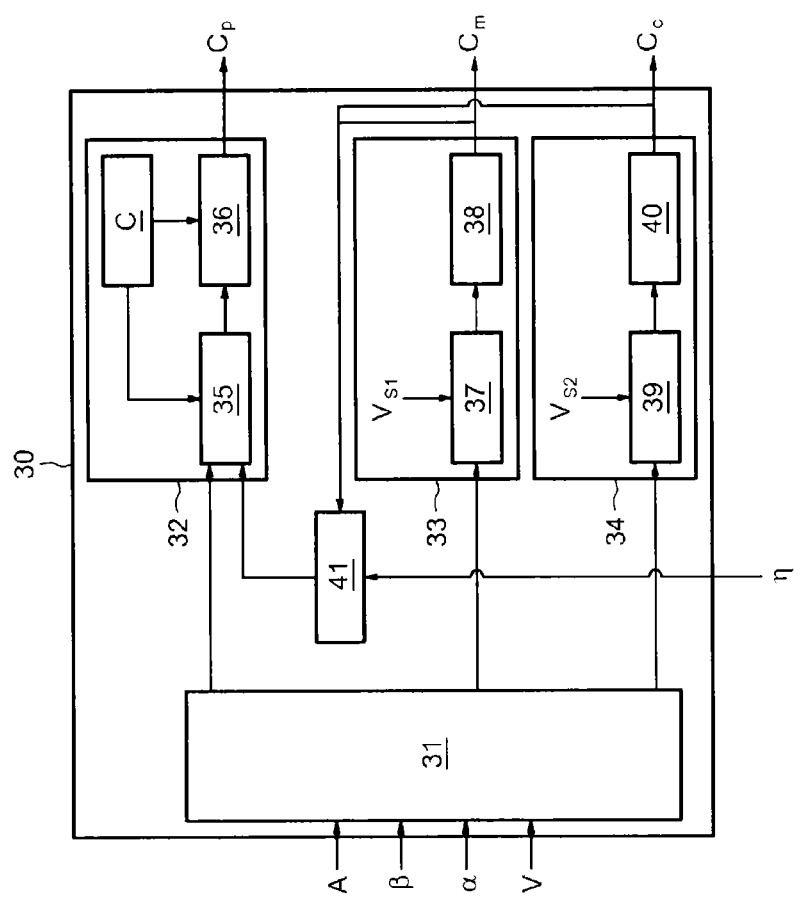
FIG. 2 is a detailed view of the control unit of FIG. 1.

As illustrated in FIG. 2, the ECU 30 comprises a module for recovering information 31 on the dynamics of the vehicle, a module 32 for controlling the flow rate of the hydraulic pumps 12, 22, 23, 24 as a function of this information, a module 33 for controlling the change of drive mode as a function of the information on the dynamics of the vehicle and a module 34 for controlling the engine torque as a function of the information on the dynamics of the vehicle. According to a variant, not shown, the driver may set the drive mode by manually selecting the drive mode by means of a button or any other means of control.

The drive modes may be selected from the operating mode with the internal combustion engine 2 alone, the operating mode with the electric motors 4, 5 alone, or the operating mode with the internal combustion engine 2 and electric motors 4, 5 combined.

The module 32 for controlling the hydraulic pumps 12, 22, 23, 24 comprises a module for calculating 35 the quantity of heat to be discharged by the electric powertrain 3 and the internal combustion engine 2 and a module for determining 36 a flow rate set point $C_p$ as a function of the calculated quantity of heat to be discharged. The module for determining 36 the flow rate set point $C_p$ receives maps C in each case relative to the engine 2 and the motors 4, 5 and inverters 6 in order to determine at which flow rate the associated hydraulic pump has to operate in order to guarantee sufficient cooling.

The flow rate set point $C_p$ is applied individually to each of the hydraulic pumps 12, 22, 23, 24, each pump having its own flow rate set point $C_p$ to be respected.

As it is known that the temperature of the heat transfer fluid of the first cooling circuit 10 and of the second cooling circuit 20 has to remain low, respectively at 90° C. and at 60° C., the hydraulic pumps 12, 22, 23, 24 are each controlled with a predetermined flow rate using one of the maps C.

For example, for the second cooling circuit 20, the inverter 6 and the two electric motors 4, 5 have to remain in the nominal operating range, i.e. the internal temperatures of the motors 4, 5 and of the inverter 6 have to remain below an operating value in degraded mode, for example 70° C. The flow rate of the hydraulic pumps 22, 23, 24 has to be 60% of the maximum flow rate of the hydraulic pumps 22, 23, 24. In the case of an increase in the internal temperature of the motors 4, 5 and the inverter 6, an increase which could cause damage to these elements, the flow rate of the hydraulic pumps 22, 23, 24 has to be 100% of the maximum flow rate.

As a function of the dynamic information of the vehicle (the speed V of the motor vehicle, the steering angle of the steering wheel α, the gradient of the road β and the adhesion to the ground A of the motor vehicle) the flow rate set points $C_p$ vary. By way of example, on an ascending gradient at low speed, the flow rate from the hydraulic pumps 22, 23, 24 is 80% of the maximum flow rate. In the case of a descending gradient at maximum permitted speed, the flow rate will be returned to 50% of the maximum flow rate. In the case of low adhesion A, the speed will be reduced while the flow rate of the hydraulic pumps 22, 23, 24 will be returned to 90% of the maximum flow rate, to permit the electric motors 4, 5 to deliver all of their power.

The information on the steering angle of the steering wheel α and the speed V of the motor vehicle influences the change of drive mode (thermal, hybrid or electric) and thus the elements to be cooled. The flow rate from the hydraulic pumps 12, 22, 23, 24 is also fixed as a function of this information.

The module for controlling 33 the change of drive mode of the vehicle comprises a comparator 37 comparing the information received from the module for recovering information 31 with threshold values $V_{s1}$ and a module for determining the drive mode 38 transmitting a set point for controlling the drive mode $C_M$ to the computers 2a, 4a, 5a of the engine 2 and the motors 4, 5.

The module for controlling 34 the engine torque comprises a comparator 39 comparing the information received from the module for recovering information 31 with threshold values $V_{s2}$ and a module for determining the torque 40 transmitting a set point for controlling the torque $C_C$ to the computers 2a, 4a, 5a of the engine 2 and the motors 4, 5.

The ECU 30 comprises a module for regulating 41 the cooling circuit as a function of the set points controlling the drive mode $C_M$ and the torque $C_C$ and the speed η of the engine 2 or each motor 4, 5 in order to regulate the control of the flow rate from the hydraulic pumps 12, 22, 23, 24.

The hydraulic pumps 12, 22, 23, 24 may be controlled by pulse width modulation, i.e. PWM. This control technique permits continuous signals to be generated using circuits with on-off operation by means of a strobing pulse generator and a low-pass filter comprising, for example, a resistor and a capacitor. Thus the control of the hydraulic pumps is implemented in a smooth manner and may be implemented using a programmable microcontroller (not shown).

Thus, the circulation of the heat transfer fluid is provided by controlling the different pumps controlled by the ECU 30 as a function of information on the dynamics of the vehicle.

The internal combustion engine 2, the electric motors 4, 5 and the inverters 6 are thus cooled efficiently without wastage by retrieving the traveling conditions of the motor vehicle.

It might also be possible to provide that the radiators 11, 21 of the cooling circuits are used to heat the passenger compartment of the motor vehicle.

The invention claimed is:

1. A cooling system for a hybrid powertrain of a motor vehicle comprising an internal combustion engine and an electric traction assembly, comprising:
    a main circuit which is able to be traversed by a heat transfer fluid in order to cool the internal combustion engine to a first temperature level, the main circuit including a first radiator to cool the heat transfer fluid, a first hydraulic pump to circulate the heat transfer fluid in the main circuit, and an electric control unit to control the first pump; and
    a secondary circuit which is able to be traversed by a heat transfer fluid in order to cool the electric traction assembly to a second temperature level, lower than the first level, the secondary circuit including a second radiator to cool the heat transfer fluid, a second hydraulic pump and a third hydraulic pump to circulate the heat transfer fluid in the secondary circuit, and an electric control unit to control the second and third pumps,
    wherein the electric traction assembly includes at least one inverter and at least one electric motor, the inverter being arranged in the secondary circuit in parallel with the electric motor such that the electric control unit controls the second and third pumps to cool the electric motor and the inverter at different flow rates of the heat transfer fluid, and
    wherein the control unit comprises a module for recovering information on dynamics of the vehicle and a module for controlling the flow rate from the hydraulic pumps as a function of the information.

2. The cooling system as claimed in claim 1, in which the information on the dynamics of the vehicle comprises a speed of the motor vehicle, a steering angle of a steering wheel, a gradient of a road and an adhesion to the road.

3. The cooling system as claimed in claim 2, in which the module for controlling the hydraulic pumps comprises a module for calculating a quantity of heat to be discharged by the electric traction assembly and the internal combustion engine and a module for determining a flow rate set point as a function of the calculated quantity of heat to be discharged.

4. The cooling system as claimed in claim 2, in which the control unit comprises a module for controlling a change of a drive mode as a function of the information on the dynamics of the vehicle or according to a manual selection by a driver of the vehicle.

5. The cooling system as claimed in claim 4, in which the control unit comprises a module for regulating the control of the pumps as a function of engine torque controls, the drive mode, and an engine speed.

6. The cooling system as claimed in claim 2, in which the control unit comprises a module for controlling an engine torque as a function of the information on the dynamics of the vehicle.

7. The cooling system as claimed in claim 1, in which the at least one inverter and the at least one electric motor of the electric traction assembly comprises two electric motors and two inverters, each associated with one of the electric motors, and in which the second cooling circuit comprises three circulating pumps, including the second pump, the third pump, and a fourth pump, respectively arranged at an outlet of the radiator, at an inlet of the inverters, and at an inlet of the radiator.

8. The cooling system as claimed in claim 1, in which the second pump is mounted at an outlet of the radiator and upstream from the electric motor and the inverter, and the third pump is mounted at an inlet of the inverter and downstream from where the electric motor branches off from inverter.

9. The cooling system as claimed in claim 1, further comprising a first expansion vessel arranged in a flow of the heat transfer fluid of the main circuit.

10. The cooling system as claimed in claim 9, wherein the first expansion vessel is mounted in parallel with the first radiator in the main circuit.

11. The cooling system as claimed in claim 9, further comprising a second expansion vessel arranged in a flow of the heat transfer fluid of the secondary circuit.

12. The cooling system as claimed in claim 11, wherein the second expansion vessel is mounted in parallel with the second radiator in the secondary circuit.

13. A cooling method for a hybrid powertrain of a motor vehicle comprising an internal combustion engine and an electric traction assembly, comprising:
    cooling the internal combustion engine to a first temperature level by circulating a heat transfer fluid in a main circuit, the main circuit including a first radiator to cool the heat transfer fluid, a first hydraulic pump to circulate the heat transfer fluid in the main circuit, and an electric control unit to control the first pump;

cooling the electric traction assembly to a second temperature level, lower than the first level, by circulating a heat transfer fluid in a secondary circuit, the secondary circuit including a second radiator to cool the heat transfer fluid, a second hydraulic pump and a third hydraulic pump to circulate the heat transfer fluid in the secondary circuit, and an electric control unit to control the second and third pumps, wherein the electric traction assembly includes at least one inverter and at least one electric motor, the inverter being arranged in the secondary circuit in parallel with the electric motor such that the electric control unit controls the second and third pumps to cool the electric motor and the inverter at different flow rates of the heat transfer fluid, wherein information is recovered on dynamics of the vehicle and the hydraulic pumps are controlled as a function of the information.

14. The cooling method as claimed in claim 13, in which the information on the dynamics of the vehicle comprises a speed of the motor vehicle, a steering angle of a steering wheel, a gradient of a road, and an adhesion to the road.

15. The cooling method as claimed in claim 14, further comprising:
controlling a change of a drive mode as a function of the information on the dynamics of the vehicle.

16. The cooling method as claimed in claim 15, further comprising:
regulating the control of the pumps as a function of engine torque controls, a drive mode, and an engine speed.

17. The cooling method as claimed in claim 14, further comprising:
controlling engine torque as a function of the information on the dynamics of the vehicle.

18. The cooling method as claimed in claim 13, in which a quantity of heat to be discharged by the electric traction assembly and the internal combustion engine is calculated and a flow rate set point is determined as a function of the calculated quantity of heat to be discharged.

* * * * *